April 19, 1932. J. L. DRAKE 1,854,399
METHOD AND APPARATUS FOR SECURING GLASS SHEETS UPON SUPPORTING TABLES
Filed June 27, 1929
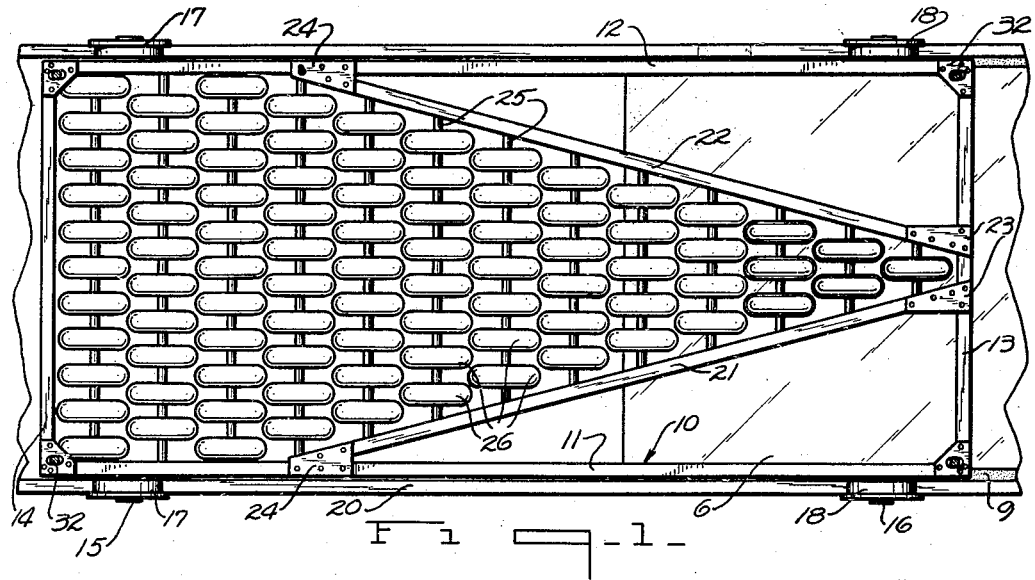
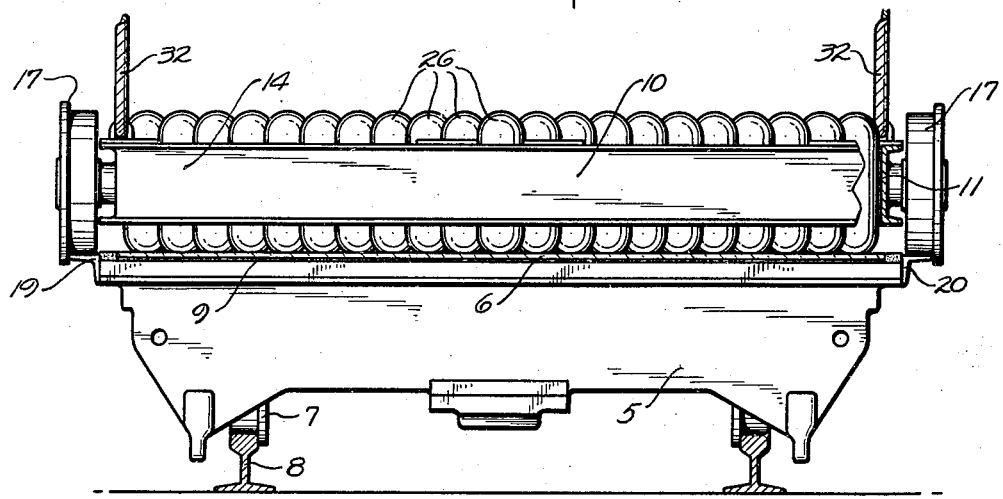
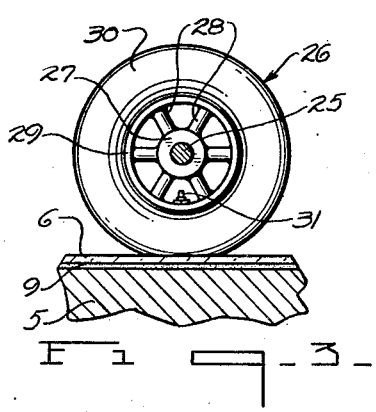
Inventor
John L. Drake
By Frank Fraser,
Attorney Patented Apr. 19, 1932

1,854,399

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR SECURING GLASS SHEETS UPON SUPPORTING TABLES

Application filed June 27, 1929. Serial No. 374,031.

The present invention relates broadly to the surfacing of sheet glass or other flat sheets or plates and more particularly to an improved method and apparatus primarily adapted for use in what is commonly termed the continuous system for surfacing sheet glass.

It will be readily understood by those versed in the art that in the continuous system above referred to, a plurality of glass sheets to be surfaced are mounted upon a series of cars or tables which are arranged end to end and movable continuously in a definite substantially horizontal path to carry the glass sheets first beneath and in engagement with a series of polishing units. In such system, it is ordinarily customary to secure the glass sheets to the tops of the cars or tables by embedding them within a relatively thin layer of plaster of Paris or some other suitable cement. The quality of the resultant finish on the glass and the amount of breakage during the grinding and polishing operations is largely dependent upon the proper securing of the glass sheets to the supporting tables.

This invention has for its principal object the provision of an improved method and apparatus for embedding the glass sheets within the plaster of Paris or other cement used in such a manner that the glass sheets will be secured to the tables in an efficient and practical manner so as to facilitate the succeeding treatment of the glass and reduce breakage from improper securing of the sheets to a minimum.

Another object of the invention is to provide such a method and apparatus wherein the pressure for forcing the sheets downwardly into the plaster is applied thereto in a novel manner and in such a manner that all or practically all of the air which may be trapped beneath the sheets when they are initially laid upon the tables will be forced from therebeneath whereby to effect the cementing of the glass sheets evenly and uniformly throughout their entire areas.

Another object of the invention is to provide such a method and apparatus wherein the pressure exerted upon the glass sheets to press them downwardly into the plaster upon the supporting tables is applied to said sheets first at substantially the centers thereof and then gradually toward their opposite side.

A further object of the invention resides in the provision of improved apparatus for the purposes above described including a frame and a plurality of pressing elements carried thereby, said pressing elements being of a yieldable resilient nature and arranged in substantially triangular formation so that upon movement of the frame over the glass the pressing elements will engage the glass first at its center and then gradually towards its opposite sides.

Other objects and advantages of the invention will become more apparent during the course of the following description when taken in connection with the accompanying drawings.

In the drawings forming a part of this application and wherein like numerals are employed to designate like parts throughout the same.

Fig. 1 is a plan view of the sheet laying apparatus or frame provided by the present invention.

Fig. 2 is a rear end view thereof, partially broken away, and

Fig. 3 is a detail view of one of the pressing elements or wheels.

As previously pointed out, the present invention is primarily designed for use in the continuous system for surfacing sheet glass wherein a plurality of tables 5 are adapted to be arranged in end to end abutting relation to form a continuous train and to carry a series of glass sheets 6 mounted thereupon progressively beneath a series of grinding and polishing units, not shown. The tables 6 are provided with wheels 7 rolling upon tracks 8 and any suitable type of driving means may be employed for effecting the desired movement of the tables. The glass sheets 6 are ordinarily secured to the tables by embedding them within a layer of plaster of Paris or the like 9.

The present invention concerns particularly the provision of novel and improved means in the form of a laying apparatus or frame for pressing the glass sheets into the plastic material to accomplish those objects above enumerated. To this end, there is provided a substantially rectangular frame designated in its entirety by the numeral 10 and including the longitudinally extending side members 11 and 12 and the transverse connecting end members 13 and 14, said side and end members consisting preferably of channel beams as clearly shown in Fig. 2. The numeral 13 designates the forward end of the frame and the numeral 14 the rear end thereof. Carried by each side member 11 and 12 adjacent opposite ends thereof are the outwardly projecting trunnions or stub shafts 15 and 16 upon which are mounted wheels 17 and 18 respectively. These wheels are adapted to ride, during the pressing of the glass, upon horizontal rails 19 and 20 preferably carried at the opposite sides of tables 5. However, it is not essential that the rails be carried by the tables since they may be carried by suitable stationary supports positioned adjacent the tables.

Arranged between the side members 11 and 12 are the two forwardly converging members 21 and 22, the forward ends thereof being secured to end member 13 in relatively close spaced relation by means of plates 23 and their opposite or rear ends secured by plates 24 to the side members intermediate the ends of the frame but relatively closer to the rear end 14 than to the front end 13. Extending between and carried by the side members 11 and 12 and the forwardly converging members 21 and 22 are a plurality of spaced parallel transverse shafts 25 upon each of which is mounted one or a plurality of rotatable pressing elements or wheels 26. It will be noted that each succeeding shaft 25 from the front to the rear end of the frame carries a progressively increasing number of pressing elements 26 so that when the frame is moved to the right over the tables 5, the pressing elements contact with the sheet first at substantialy its center and that this area of contact then gradually spreads toward opposite sides thereof. The pressing elements are arranged in a plurality of rows extending both longitudinally and transversely of the tables with the elements of adjacent rows being arranged in staggered relation. In other words, it might be said that the pressing elements are arranged in substantially triangular formation.

Each of the pressing elements 26 may, as shown in Fig. 3, be in the form of a wheel comprising the usual hub 27, spokes 28. and rim 29. Mounted upon the rim is a cushioning element which may be a conventional pneumatic tire adapted to be inflated through the provision of a valve 31 or the wheels may be tired with soft sponge rubber as preferred. Thus, there is provided a plurality of yielding, resilient pressing elements rotatable and movable as a unit over the glass. For the purpose of raising and lowering the frame, cables or the like 32 may be attached thereto at the four corners thereof and connected at their upper ends with a suitable crane.

In operation, a relatively thin layer of plastic material is first spread out over the top of one or more of the tables 5, after which one or more of the glass sheets 6 are freely laid thereupon. During the initial laying of the sheets upon the tables, the frame 10 is, of course, in a raised or elevated position so as not to interfere therewith, but after the sheets are properly placed upon the plastic material, the frame 10 is lowered until the wheels 17 and 18 thereof rest upon the rails 19 and 20. The frame is preferably initially lowered to such a position that it will be supported upon rails 19 and 20 carried by the empty tables which succeed those tables upon which the glass sheets rest. The frame is then moved to the right over the tables carrying the glass, and the pressing elements 26 engaging the upper surfaces of the sheets will act to press the sheets downwardly into the plastic material.

Due to the particular arrangement of the pressing elements 26 as above described, said elements will contact with the sheets first at the centers thereof and this area of contact will then be gradually spread out laterally toward opposite sides of the sheets. Thus, the sheets will be pressed downwardly from the center outwardly or, otherwise stated, the pressing action will be exerted upon the glass initially at the center thereof and then gradually towards its opposite sides. In this manner, the air which may have been trapped under the sheets upon the initial laying thereof upon the tables will be forced laterally and outwardly from therebeneath with the result that the said sheets will be properly secured to the tables in an even and uniform manner throughout their entire areas. Such a securing of the sheets is highly desirable in that it will both facilitate and aid in the subsequent grinding and polishing of the glass and will reduce to a minimum breakage during this treatment of the glass which heretofore has been occasioned by improper securing of the glass to the tables.

With the use of the pressing wheels hereinabove described, the pressure exerted upon the glass sheets may be varied as desired. That is, by properly controlling the inflation of the tires 30, any desired pressure can be had from zero up to the total weight of the entire device. For instance, the tires can be deflated to such an extent that practically the entire weight of the frame will be supported on the rails 19 and 20. On the other hand, the tires can be so inflated that practically the full weight of the frame will rest on the glass and very little weight received upon the rails 19 and 20. This permits an accurate control of the pressure upon the glass sheets and such pressure may be increased or decreased as conditions warrant. Due to the soft resilient nature of the pressing means, the glass sheets will not be marred thereby.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for mounting glass sheets which are to be surfaced, a bed upon which the glass is adapted to be mounted, a layer of plastic material on said bed and upon which the glass initially rests, and means for pressing the glass into the plastic material including means arranged to contact with the sheet first at its center and then at its opposite sides.

2. In apparatus for mounting glass sheets which are to be surfaced, a bed upon which the glass is adapted to be mounted, a layer of plastic material on said bed and upon which the glass initially rests, and rotatable means movable over the glass for pressing the same into the plastic material, said rotatable means being arranged to contact with the sheet first at its center and then at its opposite sides.

3. In apparatus for mounting glass sheets which are to be surfaced, a bed upon which the glass is adapted to be mounted, a layer of plastic material on said bed and upon which the glass initially rests, and means for pressing the glass into the plastic material including means exerting a pressing action upon the glass initially at the center thereof and then gradually towards its opposite sides.

4. In apparatus for mounting glass sheets which are to be surfaced, a bed upon which the glass is adapted to be mounted, a layer of plastic material on said bed and upon which the glass initially rests, and means for pressing the glass into the plastic material including rotatable means movable over the glass and exerting a pressing action thereupon initially at the center of the glass and then gradually toward opposite sides thereof.

5. In apparatus for mounting glass sheets which are to be surfaced, a bed upon which the glass is adapted to be mounted, a layer of plastic material on said bed and upon which the glass initially rests, and a plurality of rotatable pressing elements movable as a unit over the sheet and arranged to press the glass into the plastic material by exerting a pressing action initially upon the sheet at its center and then gradually toward the opposite sides thereof.

6. In apparatus for mounting glass sheets which are to be surfaced, a bed upon which the glass is adapted to be mounted, a layer of plastic material on said bed and upon which the glass initially rests, and a plurality of rotatable pressing elements movable as a unit over the sheet and so arranged as to contact with the sheet first at its center and then at its opposite sides.

7. In apparatus for mounting glass sheets which are to be surfaced, a bed upon which the glass is adapted to be mounted, a layer of plastic material on said bed and upon which the glass initially rests, a plurality of rotatable pressing elements arranged in a plurality of rows extending both transversely and longitudinally with respect to the bed, and means for moving the pressing elements as a unit over the glass to press the same into the plastic material by exerting a pressing action initially upon the sheet at its center and then gradually toward the opposite sides thereof.

8. In apparatus for mounting glass sheets which are to be surfaced, a bed upon which the glass is adapted to be mounted, a layer of plastic material on said bed and upon which the glass initially rests, and a plurality of rotatable pressing elements movable over the sheet and arranged in substantially triangular formation for pressing the glass downwardly into the plastic material.

9. In apparatus for mounting glass sheets which are to be surfaced, a bed upon which the glass is adapted to be mounted, a layer of plastic material on said bed and upon which the glass initially rests, and roller means for pressing the glass into plastic material, said roller means being arranged to contact with the sheet first at its center and then at its opposite sides.

10. In apparatus for mounting glass sheets which are to be surfaced, a bed upon which the glass is adapted to be mounted, rails arranged along opposite sides of the bed, a layer of plastic material on said bed and upon which the glass initially rests, a frame having wheels adapted to run on said rails, and means carried by the frame for pressing the glass downwardly into the plastic material.

11. In apparatus for mounting glass sheets which are to be surfaced, a bed upon which the glass is adapted to be mounted, rails arranged along opposite sides of the bed, a layer of plastic material on said bed and upon which the glass initially rests, a frame having wheels adapted to run on said rails, and a plurality of rotatable pressing elements carried by the frame for pressing the glass downwardly into the plastic material.

12. In apparatus for mounting glass sheets which are to be surfaced, a bed upon which the glass is adapted to be mounted, rails arranged along opposite sides of the bed, a layer of plastic material on said bed and upon which the glass initially rests, a frame having wheels adapted to run on said rails, and a plurality of rotatable pressing elements carried by the frame and arranged in substantially triangular formation for pressing the glass downwardly into the plastic material.

13. Apparatus of the character described, including a movable frame, and a plurality of resilient pressing elements carried by said frame and arranged in substantially triangular formation.

14. The method of embedding a glass sheet within a layer of plastic material, which consists in forcing the sheet downwardly into the plastic material by pressing the sheet downwardly first at its center and then at its opposite sides.

15. The method of embedding a glass sheet within a layer of plastic material, which consists in exerting a pressing force initially at substantially the center of the sheet and then gradually towards the opposite sides thereof.

Signed at Toledo, in the county of Lucas and State of Ohio, this 21st day of June, 1929.

JOHN L. DRAKE.